United States Patent [19]
Goodboy et al.

[11] 4,157,382
[45] Jun. 5, 1979

[54] PROCESS FOR PREPARING LOW SODA PSEUDOBOEHMITE GEL

[75] Inventors: Kenneth P. Goodboy, Pittsburgh, Pa.; James J. Koenig, Belleville, Ill.

[73] Assignee: Aluminum Company of America, Pittsburgh, Pa.

[21] Appl. No.: 898,616

[22] Filed: Apr. 21, 1978

[51] Int. Cl.$^2$ .............................................. C01F 7/14
[52] U.S. Cl. .................................. 423/628; 423/630; 252/317
[58] Field of Search ....................... 423/625, 628, 630; 252/317

[56] References Cited

U.S. PATENT DOCUMENTS

| | | | |
|---|---|---|---|
| 2,247,624 | 7/1941 | Wall | 423/630 |
| 2,943,065 | 6/1960 | Braithwaite | 423/630 |
| 3,226,191 | 12/1965 | Osment et al. | 423/628 |
| 3,268,295 | 8/1966 | Armbrust et al. | 423/625 |
| 3,739,062 | 6/1973 | Barsotti | 423/628 |
| 3,864,461 | 2/1975 | Miller et al. | 423/628 |
| 3,879,310 | 4/1975 | Rigge et al. | 423/628 |

*Primary Examiner*—Herbert T. Carter
*Attorney, Agent, or Firm*—David J. Hill; John P. Taylor

[57] ABSTRACT

A low soda pseudoboehmite gel is provided by reacting a NaAlO$_2$ solution with a NaHCO$_3$ solution having a concentration of less than 75 grams/liter and preferably less than 50 grams/liter. The soda content of the resulting AlO(OH) gel can be further lowered by repeated washing and/or redispersing (repulping) in water and/or further neutralization with a carboxylic acid having 1 to 6 carbon atoms.

6 Claims, 1 Drawing Figure

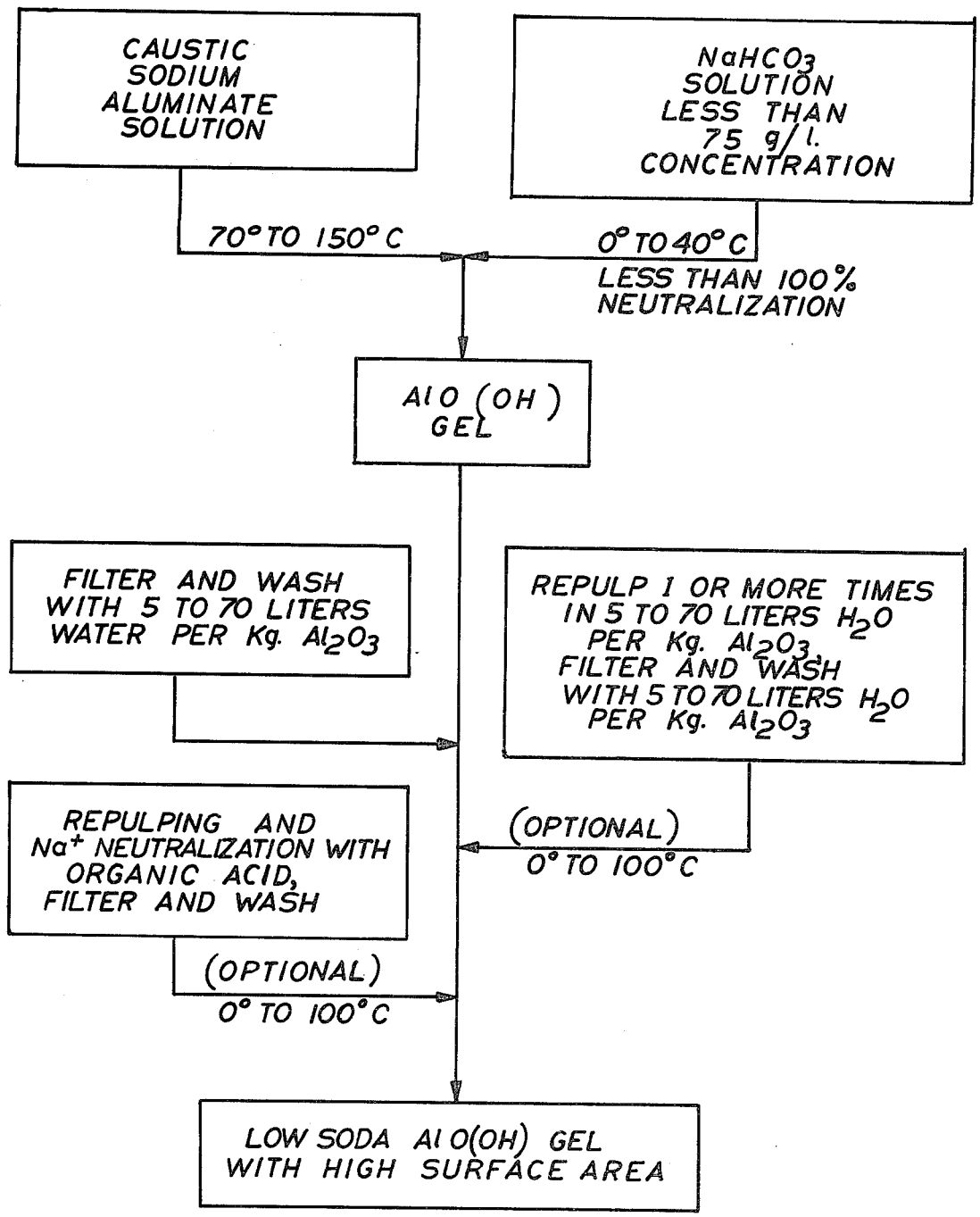

PROCESS FOR PREPARING LOW SODA PSEUDOBOEHMITE GEL

BACKGROUND OF THE INVENTION

This invention relates to production of alumina gels and more particularly to a pseudoboehmite gel having a low sodium content.

The production of a low soda ($Na_2O$) pseudoboehmite gel, i.e. having a low sodium content, would be desirable from the standpoint that lower $Na_2O$ content results in a product with a higher Brunauer-Emmett-Teller surface area and ($H_2O$) adsorption capacity. Less $Na_2O$ in the gel also means a savings in production cost from less $Na_2O$ being lost in the product and less acid, such as for example, acetic acid, being needed for pH adjustment ($Na_2O$ removal). Furthermore, pseudoboehmite gels having high $Na_2O$ content are not easily formed into balls, water breakage increases and the crushing strength decreases. Furthermore, a low $Na_2O$ gel could be useful for certain catalytic applications in addition to its use as a desiccant and adsorbent.

Pseudoboehmite gel is normally produced by reacting a sodium aluminate ($NaAlO_2$) solution with a hydrated acid salt of aluminum such as $AlCl_3.6H_2O$, $Al_2(SO_4)_3.18H_2O$, or $Al(NO_3)_3.9H_2O$ or with the equivalent acids themselves. However, the use of acid processes, while producing low soda gels, results in an acid salt by-product which is hard to dispose of according to environmental regulations.

Edward, Frary and Jeffries in *Aluminum and Its Production*, McGraw-Hill Book Company, Inc., New York (1930) at page 161 indicate that alumina can be prepared from an aluminate solution using carbon dioxide gas or sodium bicarbonate ($NaHCO_3$). When sodium bicarbonate is used (i.e. an alkaline process), it is conventional to use a concentrated solution having approximately 80-100 grams/liter $NaHCO_3$ to provide sufficient neutralization of the basic sodium aluminate solution. The resultant product, however, can contain about 3-6% $Na_2O$ by total weight of the $Al_2O_3$ (the calcined product of the pseudoboehmite gel). Quite surprisingly, however, we have now discovered that a low $Na_2O$ pseudoboehmite gel can be produced having enhanced surface area as well, while still using an alkaline process.

SUMMARY OF THE INVENTION

In accordance with the invention, a pseudoboehmite gel having a $Na_2O$ content of less than 3% by total weight of the calcined $Al_2O_3$ product and characterized by a BET surface area of greater than 325 meter$^2$/gram is produced by reacting a sodium aluminate solution with a sufficient amount of sodium bicarbonate solution having a concentration of less than 75 grams/liter, and preferably less than 50 grams/liter to provide approximately 95% but less than 100% neutralization of the NaOH and $NaAlO_2$ in the solution.

BRIEF DESCRIPTION OF THE DRAWING

The sole drawing is a flowsheet illustrating the process of the invention.

DESCRIPTION OF THE PREFERRED EMBODIMENTS

In accordance with the invention, a pseudoboehmite gel having a $Na_2O$ content of less than 3% by total weight of the calcined $Al_2O_3$ product is produced by reacting a sodium aluminate solution with a sodium bicarbonate solution.

The term "pseudoboehmite" is used to describe the AlO(OH) precipitated gel product which results from the neutralization of sodium aluminate. The term was derived to distinguish it from chemically similar crystalline boehmite because the pseudoboehmite and the crystalline boehmite exhibit different x-ray diffraction patterns. The pseudoboehmite exhibits a pattern of broad, diffused bands of $\alpha$-AlO(OH) while the crystalline boehmite has a similar x-ray diffraction pattern but with distinct lines. The pseudoboehmite also usually exhibits a much higher Brunauer-Emmett-Teller (BET) surface area (approximately 300–600 m$^2$/g); whereas hydrothermally prepared boehmite has a much lower surface area (usually less than 100 m$^2$/g). Psuedoboehmite therefore may be defined as an alumina having the chemical formula AlO(OH) which has a loss on ignition (LOI) at 1200° C. for 1 hour between about 20–30% by weight (boehmite = 15.0% LOI) and contains at least about 50% by weight of pseudoboehmite as determined by intensity of diffraction of copper ($K_a$) radiation (from the 020 planes), the corresponding interplanar distance being 6.5–6.8 Angstroms.

The sodium bicarbonate is used in a concentration of less than 75 g/l and preferably at a concentration of approximately 10–50 g/l. The sodium aluminate-NaOH solution used may be a synthetically produced solution (e.g., using aluminum trihydroxide) or may be the product of a Bayer or sinter process. A typical $NaAlO_2$ solution but not limiting to this invention, is about 100–400 g/l of total caustic at 0.6–0.8 $Al_2O_3$/total caustic (as $Na_2CO_3$) ratio. The more concentrated $NaAlO_2$ solutions are more desirable since there is proportionately less filtrate to handle. When the concentration of $Al_2O_3$ is about 80 grams per liter of liquor at a 0.8 ratio, a solution of sodium bicarbonate having a concentration of 50 grams per liter can be used in a volumetric ratio of approximately 3 liters sodium bicarbonate solution per liter of liquor. However, the amount of sodium bicarbonate needed will vary in accordance with the caustic content of the liquor. The total amount of sodium bicarbonate used for the neutralization of the NaOH and $NaAlO_2$ should not be sufficient to provide 100% neutralization. Preferably, the neutralization should not exceed about 95%; otherwise, dawsonite [NaAl(CO$_3$)(OH)$_2$] may form. By 95% is meant, 95% of the moles of Na+ in the solution as NaOH and $NaAlO_2$. In fact, while we do not wish to be bound by any theory of operation, it is our belief that the surprising results achieved by this invention, i.e. use of lower concentration $NaHCO_3$, than formerly done by the prior art, may result in lower amounts of $Na_2O$ in the gel due to inhibition of the formation of dawsonite which would otherwise be difficult to break down for further removal of $Na_2O$.

The sodium bicarbonate solution can be used at a temperature of 0° C. up to about 40° C., the decomposition temperature. The sodium aluminate solution is maintained at a temperature from 70°–150° C. prior to mixing with the sodium bicarbonate to avoid premature precipitation. A lower solution temperature can be used if the $NaAlO_2$ contains a stabilizer such as sodium gluconate. The solutions are blended together with mixed until approximately 95% of the Na+ is neutralized as indicated by a pH of about 11.2.

In accordance with the preferred embodiment of the invention, the gel slurry is filtered and residual $Na_2O$ removed with repeated washings of the filter cake with water (preferably deionized water), redispersed (re-pulped) one or more times in water, each time the slurry being subsequently filtered and washed, and then redispersed and the $Na_2O$ neutralized with a carboxylic acid at a pH (of the repulp) of <10 to remove further amounts of $Na_2O$ and to further increase the surface area of the resultant pseudoboehmite. The product is then filtered and washed. Such organic acids include carbonic, formic, acetic, propionic, as well as any other organic acids, having 1-6 carbon atoms. Preferably, the perature in each instance was about 44° C., a typical pH of the resulting gel slurry was 11.2, and the filtration temperature was 88° C. Each resultant gel filter cake was washed with 5.4 ml of deionized water per gram of dry gel AlO(OH). In each instance the solids were repulped twice in deionized water at a ratio of 51.7 grams of solid per liter of water, filtered and washed. The results are tabulated in Table I. Note that to obtain the desired 95% neutralization, the total amount of $NaHCO_3$ was the same in each instance, only the concentration was varied.

TABLE I

| Sample | Initial Gel Slurry g/l $Na_2CO_3$* | g/l $NaHCO_3$ | ml $NaHCO_3$ | Precipitation °C. | Precipitation pH | % LOI (1200° C.) dried filter cake | % $Na_2O$ in Gel, Calcined Basis | B.E.T. S.A., $m^2/g$ |
|---|---|---|---|---|---|---|---|---|
| 1 | 12 | 10 | 2000 | 38 | 10.92 | 21.50 | 1.04 | 420 |
| 2 | 28 | 25 | 800 | 40 | 11.06 | 24.84 | 1.46 | 408 |
| 3 | 41 | 40 | 500 | 42 | 11.19 | 26.28 | 1.81 | 342 |
| 4 | 49 | 50 | 400 | 43 | 11.22 | 21.96 | 1.99 | 343 |
| 5 | 65 | 75 | 267 | 48 | 11.28 | 22.33 | 2.56 | 337 |
| 6 | 78 | 100 | 200 | 50 | 11.69 | 23.32 | 3.34 | 312 |

*$Na_2CO_3$ formed after precipitation, excess $NaAlO_2+NaOH$ calculated as $Na_2CO_3$.

amount of acid used during the final acid repulp should provide a pH range of about 5-8 although improvements in the gel will be seen at a pH of less than 10. It should be noted that, although pH's <5 will work quite well for $Na_2O$ removal and increasing surface area, filtration rates become slow.

It was quite surprising to find that at identical pH levels, repulps using organic acids resulted in higher surface area gels in contrast to inorganic acids (HCl, $HNO_3$, $H_2SO_4$, $H_3PO_4$ for example).

The amount of water used in the washes and repulps is typically about 5-70 liters per kg of $Al_2O_3$ but is not limited to this range.

The temperature of the repulp solution to which the acid is added may be any temperature about 0° C. and less than 100° C. However, the higher temperatures are preferred to expedite filtration. To further illustrate the invention, the following experiments were carried out.

EXAMPLE I

A sodium aluminate liquor was made up by atmospheric digestion of Alcoa C331 Bayer trihydrate [Al(OH)$_3$] with Mallinckrodt analytical grade NaOH pellets to provide a liquor having an analysis of 80 grams/liter $Al_2O_3$ and 100 grams/liter total caustic (computed as $Na_2CO_3$) at a ratio of 80 parts $Al_2O_3$ per 100 parts total caustic.

The liquor was heated to 82° C. and then mixed with various concentrations of Baker reagent grade $NaHCO_3$ solution at 38° C. in a stainless steel beaker. In each instance, a sufficient amount of $NaHCO_3$ solution was used to provide 95% neutralization of the $NaOH+NaAlO_2$ in the liquor. The resulting precipitation tem- The results indicate a significant increase in the surface area and reduced $Na_2O$ content when 75 grams/liter or less $NaHCO_3$ was used.

EXAMPLE 2

To illustrate that lowering of the $Na_2O$ content in pseudoboehmite gel is not due solely to the lower $Na_2O$ content of the initial gel slurry, several runs were made with the sodium aluminate liquor of Example I and 100 grams/liter $NaHCO_3$ in which various amounts of $Na_2SO_4$ were added to raise the total $Na_2O$ concentration in the resulting initial gel slurry. The data clearly indicate that the solutions containing less $NaHCO_3$ (samples 1-5) definitely result in a gel having a lower $Na_2O$ content as well as increased surface area. In the case of samples 7 & 8, the total $Na_2O$ content in the gel slurry was artificially raised (by the addition of sodium sulfate) yet the soda content and surface areas of the gels were still approximately the same as sample 6, indicating that the lower soda content is due primarily to useage of a lower concentration of $NaHCO_3$, not simply a lowering of the total $Na_2O$ content of the initial gel slurry although the latter does have an influence.

TABLE II

| Sample | g/l $NaHCO_3$ | Initial Gel Slurry g/l $Na_2CO_3$* | g/l $Na_2SO_4$** | Precipitation °C. | Precipitation pH | % LOI (1200° C.) dried filter cake | % $Na_2O$ in Gel, Calcined Basis | B.E.T. S.A., $m^2/g$ |
|---|---|---|---|---|---|---|---|---|
| 5 | 75 | 65 | 0 | 48 | 11.28 | 22.33 | 2.56 | 337 |
| 6 | 100 | 78 | 0 | 50 | 11.69 | 23.32 | 3.34 | 312 |
| 7 | 100 | 93 | 33.3 | 53 | 11.37 | 22.99 | 3.51 | 291 |
| 8 | 100 | 108 | 66.6 | 52 | 11.47 | 23.87 | 3.55 | 318 |

*Equivalent total $Na_2O$ expressed as $Na_2CO_3$ (i.e. sodium aluminate plus sodium hydroxide plus sodium sulfate).
**Added to $NaHCO_3$ solution.

EXAMPLE 3

To illustrate that extremely low $Na_2O$ gels can be made by a totally alkaline process without the use of acid repulps or acid washes, Example I was repeated with 10 times more wash water. Table III shows that a 0.02 % $Na_2O$ gel can be obtained when a low $NaHCO_2$ concentration is used in conjunction with greater wash volumes.

TABLE III

| Sample | Total 1 wash H$_2$O per kg Al$_2$O$_3$ | % LOI (1200° C.) dried filter cake | % Na$_2$O in Gel, Calcined Basis | B.E.T. S.A., m$^2$g |
| --- | --- | --- | --- | --- |
| 1 | 7.06 | 23.32 | 3.34 | 312 |
| 9 | 70.60 | 24.85 | 0.02 | 444 |

The next example shows the beneficial results of organic acid repulps in greatly increasing surface area and reduced Na$_2$O content.

EXAMPLE 4

To further illustrate the invention with respect to the removal of Na$_2$O and increased surface area by redispersing or repulping with organic acids in a pH range of 5–10, a series of gels were made by first reacting the NaAlO$_2$ liquor of Example 1 with a NaHCO$_3$ solution having a concentration of 100 g/l. Each gel was then treated as in Example 1. In the final (second) repulp, the respective acid was added to the repulp which was at 88° C.

A number of inorganic acids were also used similarly on identical gels as an additional comparison. The results in Table III show the superior results obtained when an organic acid, in a pH range of 5–10, is used on a gel formed by neutralization of a NaAlO$_2$ liquor with a NaHCO$_2$ solution, in contrast to repulps made using inorganic acids or just repulping with water.

TABLE IV

| Sample | Acid | final repulp pH | % LOI (1200° C.) dried filter cake | % Na$_2$O in Gel, Calcined Basis | B.E.T. S.A., m$^2$/g |
| --- | --- | --- | --- | --- | --- |
| 6 | none | 10.40 | 23.32 | 3.34 | 312 |
| 10 | acetic | 10.00 | 23.52 | 2.77 | 380 |
| 11 | acetic | 9.00 | 25.18 | 2.58 | 395 |
| 12 | acetic | 8.00 | 24.00 | 2.29 | 423 |
| 13 | acetic | 7.00 | 23.59 | 1.90 | 501 |
| 14 | acetic | 6.00 | 29.99 | 1.39 | 567 |
| 15 | acetic | 5.00 | 29.74 | 0.98 | 553 |
| 16 | propionic | 5.00 | 28.43 | 1.22 | 569 |
| 17 | formic | 5.00 | 24.31 | 1.33 | 482 |
| 18 | carbonic | 7.00 | 21.95 | 2.08 | 358 |
| 19 | HCl | 5.00 | 24.05 | 1.94 | 421 |
| 20 | HNO$_3$ | 5.00 | 26.94 | 2.22 | 396 |
| 21 | H$_2$SO$_4$ | 5.00 | 26.97 | 2.36 | 392 |
| 22 | H$_3$PO$_4$ | 5.00 | 17.72 | 2.80 | 462 |

Having thus described the invention, what is claimed is:

1. A process for making a pseudoboehmite gel having a BET surface area of at least 325 m$^2$/g and a Na$_2$O content less than 3% by weight which consists of:
   (a) reacting NaAlO$_2$ solution with a sufficient amount of a NaHCO$_3$ solution having a concentration of less than 75 grams/liter to neutralize approximately 95% of the Na$^+$ in said NaAlO$_2$ to form a low Na$_2$O content pseudoboehmite gel while inhibiting the formation of dawsonite;
   (b) filtering the gel slurry to recover a gel filter cake; and
   (c) repulping and washing the resultant AlO(OH) product to further lower the Na$_2$O content.

2. The process of claim 1 wherein the AlO(OH) product is washed one or more times with water in an amount equal to 5–70 liters per kilogram of Al$_2$O$_3$ per treatment.

3. The process of claim 2 wherein the washed AlO(OH) is repulped in water at a pH of 5–8 and neutralized with a carboxylic acid containing 1–6 carbon atoms to further lower the Na$_2$O content to less than 3% and/or to increase the surface area.

4. The process of claim 3 wherein the NaHCO$_3$ concentration is less than 50 grams/liter.

5. A process for making a pseudoboehmite gel having a BET surface area of at least 325 m$^2$/g and a Na$_2$O content of less than 3% of the Al$_2$O$_3$ weight which consists of:
   (a) reacting a solution containing 100–400 g/l caustic as Na$_2$CO$_3$ and 0.6–0.8 grams Al$_2$O$_3$ per gram of caustic as Na$_2$CO$_3$ with a sufficient amount of solution containing less than 75 g/l NaHCO$_3$ to neutralize approximately 95% but less than 100% of the Na$^+$ in the solution as NaOH and NaAlO$_2$ to form a AlO(OH) gel while inhibiting the formation of dawsonite; and
   (b) washing and/or redispersing (repulping) the AlO(OH) product with water in an amount equal to 5–70 l/kg of Al$_2$O$_3$ one or more times.

6. A process for making a pseudoboehmite gel having a BET surface area of at least 325 m$^2$/g and Na$_2$O content less than 3% by weight which comprises:
   (a) reacting a NaAlO$_2$ solution with a sufficient amount of a NaHCO$_3$ solution having a concentration of less than 75 grams/liter to neutralize approximately 95% of the Na$^+$ in said NaAlO$_2$ to form a low Na$_2$O content pseudoboehmite gel while inhibiting the formation of dawsonite;
   (b) filtering the gel slurry to recover a gel filter cake;
   (c) pulping and washing the resultant AlO(OH) product to further lower the Na$_2$O content; and
   (d) repulping the washed AlO(OH) in water at a pH of 5–8 and neutralizing with a carboxylic acid containing 1–6 carbon atoms to further lower the Na$_2$O content to less than 3% and/or to increase the surface area.

* * * * *

UNITED STATES PATENT AND TRADEMARK OFFICE
CERTIFICATE OF CORRECTION

PATENT NO. : 4,157,382
DATED : June 5, 1979
INVENTOR(S) : Kenneth P. Goodboy et al.

It is certified that error appears in the above-identified patent and that said Letters Patent are hereby corrected as shown below:

| | |
|---|---|
| Col. 2, line 16 | Change "Psuedoboehmite" to --Pseudoboehmite--. |
| Col. 2, line 64 | After "together" change "with" to --and--. |
| Col. 4, line 66 | Change "$NaHCO_2$" to --$NaHCO_3$--. |
| Table III, Col. 5, line 3 | Change "$m^2g$" to --$m^2/g$--. |
| Col. 5, line 27 | Change "$NaHCO_2$" to --$NaHCO_3$--. |
| Col. 5, line 51 | After "reacting" insert --a--. |
| Col. 6, line 57 | Change "pulping" to --repulping--. |

Signed and Sealed this

Twenty-eighth Day of August 1979

[SEAL]

Attest:

*Attesting Officer*

LUTRELLE F. PARKER
*Acting Commissioner of Patents and Trademarks*